Patented May 17, 1938

2,117,463

UNITED STATES PATENT OFFICE 2,117,463

METHOD OF PRODUCING ISOPULEGOL

Charles O. Terwilliger, Birmingham, Ala., assignor, by mesne assignments, to Theodore Swann, Birmingham, Ala.

No Drawing. Application September 28, 1936, Serial No. 102,981

12 Claims. (Cl. 260—153)

This invention relates to the conversion of citronellal to isopulegol, and has for its principal object the provision of such a process which shall be simple and easily carried out and whereby satisfactory yields may be obtained.

Citronellal obtained by fractional distillation of citronella oil is generally reported in the literature as a mixture of aldehydes (Simonsen, "The Terpenes", 1931 Ed.), represented by the formulae

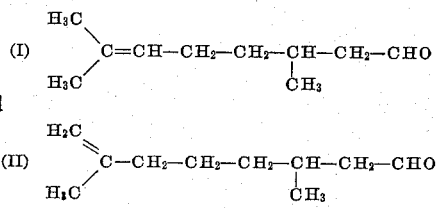

and

Isopulegol is a substance obtained from Formula II. Formula I apparently does not enter into the reaction. Upon hydrogenation by known methods, isopulegol produces, among other products, crystalline U. S. P., (XI) Menthol. This menthol is optically active, having a specific laevo rotation of —45° to —55° ($N_{aD}$ line). Isopulegol has not been found to occur in nature, but has heretofore been produced in the laboratory principally by heating citronellal with acetic acid or acetic anhydride to produce isopulegol acetate, and also menthone. Isopulegol acetate, upon hydrolysis yields isopulegol. The yields by this method are very low, due to the predominance of side reactions producing heavier cyclic compounds.

In 1931, Kuwata reported (J. Soc. Chem. Ind. Japan 34, 70-2B) that upon heating citronellal with "Japanese acid clay" a violent exothermic reaction occurred, from which he isolated a large number of chemical compounds, not all of which were identified, and 32% of the theoretical amount of isopulegol. While this yield is higher than can be obtained by the treatment of citronellal with acetic acid or acetic anhydride, it is still too low a yield to serve as a means for a commercial source of menthol.

The difficulty of the problem has been to find a vehicle to bring about the conversion to isopulegol, without at the same time causing the formation of undesired compounds. Of the many reactions which may occur, it is necessary for a commercially feasible process, that the conversion to isopulegol take place in preference to other possible reactions.

In my investigation of the problem, I have repeated the work of Kuwata and have found that only a small percentage of the theoretical yield of isopulegol may be thus obtained. Similar results were observed when ferric oxide, kaolin, and ordinary red clay were employed as catalysts.

In my investigation of the problem, I have found that a siliceous earth containing certain metallic impurities, particularly a small amount of the oxide of iron, acts as a catalyst to bring about the reaction sought, to the exclusion of undesired side reactions. In particular, diatomaceous earth having a formula approximating

| | Per cent |
|---|---|
| $SiO_2$ | 92.30 |
| $Al_2O_3$ | 3.90 |
| $Fe_2O_3$ | 1.40 |
| $TiO_2$ | 0.15 |
| CaO and MgO | 0.90 |
| Total alkali as $Na_2O$ | 0.80 | if properly treated, as hereinafter set forth, and added to citronellal in finely divided form, the citronellal being heated to the proper temperature and agitated during the reaction, will produce approximately 90% of the theoretically possible yield of isopulegol.

The diatomaceous earth should be calcined before use in a suitable furnace, preferably at a temperature of from 1700° to 1750° F. Better results are obtained if a small amount of carbon be mixed with the earth before calcining. After calcining, the earth is ground until in a finely divided form, and screened, when it is ready for use.

The diatomaceous earth which I have found best suited for my purpose is found in the California and Florida deposits, though it is to be understood that my invention is not limited to the use of earth from those particular deposits. It should be used when freshly calcined, as I have found that upon long exposure to the atmosphere, its catalytic properties are greatly weakened and sometimes completely lost.

In carrying out my improved process, I add the diatomaceous earth to the citronellal in an amount equal to from 2% to 5% of the weight of the citronellal. The mixture is heated to a temperature of from 130° to 135° C. and agitated until the reaction is complete. The reaction is exothermic, and while it is necessary to heat the mixture to start the reaction, it may be necessary to employ some cooling means in order to prevent the temperature from going too high. The temperature should not be allowed to exceed 140° C., or otherwise an excess of undesirable side reactions occur.

Agitation of the mixture is preferably accomplished by passing a gas through the mixture while the reaction is going on. With freshly calcined diatomaceous earth a stream of air may be employed with good results. If the earth has partially lost its catalytic power, a stream of $CO_2$ gas appears to produce the best results.

The reaction should go to completion in from three to twelve hours time, depending upon the "activity", amount, and degree of dispersion of the catalyst. The reaction may be considered as complete when the refractive index, at 20° C., is from 1.4721 to 1.4728. Also, it may be determined by ascertaining the aldehyde content of the mixture, which should be reduced to around 2% or less.

After the reaction is complete, the resulting mixture is hydrogenated by known methods, whereupon the isopulegol produces menthol which may be separated and refined by methods which form no part of my present invention.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. A method of converting citronellal to isopulegol which comprises heating with agitation citronellal and a diatomaceous earth catalyst containing metallic impurities up to 8%.

2. A method of converting citronellal to isopulegol which comprises adding to citronellal a diatomaceous earth containing iron oxide as an impurity in finely divided form, heating the mixture to around 135° C., and agitating to maintain the diatomaceous earth in suspension while the reaction is going on.

3. A method of converting citronellal to isopulegol which comprises introducing into the citronellal with agitation finely divided diatomaceous earth, and maintaining the temperature around 135° C. while the reaction is proceeding.

4. A method of converting citronellal to isopulegol which comprises introducing into the citronellal with agitation finely divided calcined diatomaceous earth, heating the mixture to start the reaction, and maintaining the temperature of the mixture to an upper limit of 140° C. as the reaction proceeds.

5. A method of converting citronellal to isopulegol which comprises heating citronellal with calcined diatomaceous earth to a temperature of from 130° to 140° C.

6. A method of converting citronellal to isopulegol which comprises heating citronellal with calcined diatomaceous earth to a temperature of from 130° to 140° C., and stirring the mixture while the reaction is going on.

7. A method of converting citronellal to isopulegol which comprises heating citronellal with calcined diatomaceous earth to a temperature of from 130° to 140° C., and stirring the mixture by passing a stream of gas therethrough while the reaction is going on.

8. A method of converting citronellal to isopulegol which comprises heating citronellal with from 2 to 5% of its weight of finely ground calcined diatomaceous earth, maintaining the mixture at a temperature of from 130° to 140° C. while the reaction is going on, meanwhile agitating the mixture to maintain the diatomaceous earth in suspension therein.

9. A method of converting citronellal to isopulegol which comprises heating citronellal with from 2 to 5% of its weight of finely ground calcined diatomaceous earth, maintaining the mixture at a temperature of from 130° to 140° C. while the reaction is going on, meanwhile agitating the mixture to maintain the diatomaceous earth in suspension therein, and continuing the treatment until the mixture has a refractive index at 20° C. of 1.4721 to 1.4728.

10. A method of converting citronellal to isopulegol which comprises heating citronellal with from 2 to 5% of its weight of finely ground calcined diatomaceous earth, maintaining the mixture at a temperature of from 130° to 140° C. while the reaction is going on, meanwhile agitating the mixture by passing a stream of carbon dioxide therethrough to maintain the diatomaceous earth in suspension therein, and continuing the treatment until the mixture has a refractive index at 20° C. of 1.4721 to 1.4728.

11. The method of converting citronellal to isopulegol which comprises calcining diatomaceous earth having a silica content of around 92%, in the presence of carbon, grinding the calcined earth, adding the thus treated earth to citronellal, and heating and agitating the mixture while the reaction is going on.

12. The method of converting citronellal to isopulegol which comprises calcining diatomaceous earth having a silica content of around 92%, in the presence of carbon, grinding the calcined earth, adding the thus treated earth to citronellal, maintaining the temperature of the mixture at from 130° to 140° C., and agitating the same while the reaction is going on to maintain the diatomaceous earth in suspension.

CHARLES O. TERWILLIGER.